United States Patent
McCarthy, Jr. et al.

(10) Patent No.: US 11,333,049 B2
(45) Date of Patent: May 17, 2022

(54) VALVETRAIN WITH VARIABLE VALVE ACTUATION

(71) Applicant: Eaton Corporation, Cleveland, OH (US)

(72) Inventors: James E. McCarthy, Jr., Kalamazoo, MI (US); Eric Yankovic, Augusta, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/170,593

(22) Filed: Oct. 25, 2018

(65) Prior Publication Data

US 2019/0063273 A1    Feb. 28, 2019

Related U.S. Application Data

(63) Continuation of application No. PCT/US2017/029486, filed on Apr. 25, 2017.
(Continued)

(51) Int. Cl.
*F01L 13/06* (2006.01)
*F01L 13/00* (2006.01)
(Continued)

(52) U.S. Cl.
CPC ............... *F01L 13/06* (2013.01); *F01L 1/24* (2013.01); *F01L 1/26* (2013.01); *F01L 1/265* (2013.01);
(Continued)

(58) Field of Classification Search
CPC ....... Y02T 10/18; Y02T 10/142; F02D 13/06; F02D 13/0207; F02D 13/0269;
(Continued)

(56) References Cited

U.S. PATENT DOCUMENTS

| | | | | | |
|---|---|---|---|---|---|
| 5,490,486 | A | * | 2/1996 | Diggs | F01L 1/185 123/198 F |
| 6,705,259 | B1 | * | 3/2004 | Sellnau | F01L 1/08 123/90.16 |

(Continued)

FOREIGN PATENT DOCUMENTS

| | | |
|---|---|---|
| CN | 101968000 A | 2/2011 |
| CN | 103256088 A | 8/2013 |
| EP | 2770174 A1 | 8/2014 |

OTHER PUBLICATIONS

International Search Report and Written Opinion for International Application No. PCT/US2017/029486 dated Aug. 3, 2017, 16 pages.

(Continued)

*Primary Examiner* — Patrick Hamo
*Assistant Examiner* — Wesley G Harris
(74) *Attorney, Agent, or Firm* — RMCK Law Group PLC (57) ABSTRACT

A method of providing a rocker arm set for a valvetrain includes providing a first intake rocker arm, a second intake rocker arm and a first exhaust rocker arm. The first intake rocker arm is configured as a switching rocker arm for a first intake valve on a first cylinder. The second intake rocker arm is for a second intake valve on a second cylinder. The second rocker arm is configured to operate in a normal Otto cycle mode. The first exhaust rocker arm is provided for a first exhaust valve on the second cylinder. The first intake rocker arm operates in one of an LIVC or EIVC mode where the first intake rocker arm is configured to open or close at a different time compared to the second intake valve. The first exhaust rocker arm operates in a cylinder deactivation mode.

23 Claims, 7 Drawing Sheets

Related U.S. Application Data (60) Provisional application No. 62/330,517, filed on May 2, 2016, provisional application No. 62/327,144, filed on Apr. 25, 2016.

(51) Int. Cl.
*F02D 13/02* (2006.01)
*F02D 13/04* (2006.01)
*F01L 1/26* (2006.01)
*F01L 1/24* (2006.01)
*F02D 13/06* (2006.01)
*F02D 41/00* (2006.01)

(52) U.S. Cl.
CPC ............. *F01L 1/267* (2013.01); *F01L 13/00* (2013.01); *F01L 13/0005* (2013.01); *F02D 13/0207* (2013.01); *F02D 13/0269* (2013.01); *F02D 13/04* (2013.01); *F02D 13/06* (2013.01); *F01L 2013/001* (2013.01); *F02D 2041/001* (2013.01); *Y02T 10/12* (2013.01)

(58) Field of Classification Search
CPC .............. F02D 13/04; F02D 2041/001; F01L 13/0036; F01L 1/267; F01L 13/06; F01L 1/26; F01L 13/00; F01L 1/24; F01L 1/265; F01L 2013/001
USPC .............................. 123/90.15, 90.16, 198 F
See application file for complete search history.

(56) References Cited

U.S. PATENT DOCUMENTS

| | | | |
|---|---|---|---|
| 2003/0145810 A1 | 8/2003 | Leman et al. | |
| 2004/0099244 A1 | 5/2004 | Matsuura et al. | |
| 2007/0142152 A1* | 6/2007 | Holmes | B60K 6/445 475/2 |
| 2009/0205595 A1 | 8/2009 | Lee et al. | |
| 2012/0210964 A1* | 8/2012 | Barnes | F01L 1/053 123/90.39 |
| 2015/0345343 A1 | 12/2015 | Lee et al. | |

OTHER PUBLICATIONS

Chinese Office Action for CN Application No. 201780034703.8 dated Mar. 2, 2021.

\* cited by examiner

| Cylinder | Cylinders 1-3 (Turbocharger 1) | | | Cylinders 4-6 (Turbocharger 2) | | |
|---|---|---|---|---|---|---|
| | 1 | 2 | 3 | 4 | 5 | 6 |
| Intake | RR1 RR2 | RR1 RR2 | RR1 RR2 | RR1 | RR1 | RR1 |
| Exhaust | RR3 RR4 | RR3 RR4 | RR3 RR4 | RR5 RR4 | RR5 RR4 | RR5 RR4 |

| | | | Functions | |
|---|---|---|---|---|
| Side | Rocker Arm | Type | Default | Switching |
| Intake | RR1: | Switchable | Normal Valve Lift | LIVC (or EIVC) |
| Intake | RR2: | Switchable | Valve Closed | Valve Open |
| Exhaust | RR3: | Switchable | Normal Valve Lift | Deactivation (valve closed) |
| Exhaust | RR4: | Switchable | Valve Closed | Engine Braking |
| Exhaust | RR5: | Standard | Normal Valve Lift | N/A |

| Intake/Exhaust | Cylinders 1-3 | | | Cylinders 4-6 | | |
|---|---|---|---|---|---|---|
| | 1 | 2 | 3 | 4 | 5 | 6 |
| Intake | CDA + HLA (RR1) LIVC or EIVC (RR2) | CDA + HLA (RR1) LIVC or EIVC (RR2) | CDA + HLA (RR1) LIVC or EIVC (RR2) | CDA + HLA (RR1) LIVC or EIVC (RR2) | CDA + HLA (RR1) LIVC or EIVC (RR2) | CDA + HLA (RR1) LIVC or EIVC (RR2) |
| Exhaust | CDA + HLA | CDA + HLA | CDA + HLA | CDA + HLA | CDA + HLA | CDA + HLA |

| Exhaust | Intake |
|---|---|
| CDA + HLA | CDA + HLA (RR1) EIVC (RR2) |
| CDA + HLA | CDA + HLA (RR1) EIVC (RR2) |
| CDA + HLA | CDA + HLA (RR1) EIVC (RR2) |
| CDA + HLA | CDA + HLA (RR1) EIVC (RR2) |
| CDA + HLA | CDA + HLA (RR1) EIVC (RR2) |
| CDA + HLA | CDA + HLA (RR1) EIVC (RR2) |

320

330

| Exhaust | Intake |
|---|---|
| CDA + HLA (RR1) Brake (RR2) | CDA (RR1) LIVC (RR2) |
| CDA + HLA (RR1) Brake (RR2) | CDA (RR1) LIVC (RR2) |
| CDA + HLA (RR1) Brake (RR2) | CDA (RR1) LIVC (RR2) |
| CDA + HLA (RR1) Brake (RR2) | CDA (RR1) LIVC (RR2) |
| CDA + HLA (RR1) Brake (RR2) | CDA (RR1) LIVC (RR2) |
| CDA + HLA (RR1) Brake (RR2) | CDA (RR1) LIVC (RR2) |

| Exhaust | Intake |
|---|---|
| Brake / CDA | CDA / EIVC |
| Brake / CDA | CDA / EIVC |
| Brake / CDA | CDA / EIVC |
| Brake / CDA | CDA / EIVC |
| Brake / CDA | CDA / EIVC |
| Brake / CDA | CDA / EIVC |

| Exhaust | Intake |
|---|---|
| CDA / EEVO Additional Brake Arm | CDA / LIVC |
| CDA / EEVO Additional Brake Arm | CDA / LIVC |
| CDA / EEVO Additional Brake Arm | CDA / LIVC |
| CDA / EEVO Additional Brake Arm | CDA / LIVC |
| CDA / EEVO Additional Brake Arm | CDA / LIVC |
| CDA / EEVO Additional Brake Arm | CDA / LIVC |

350

| Exhaust | Intake |
|---|---|
| CDA<br>Additional Brake Arm | CDA |
| CDA<br>Additional Brake Arm | CDA |
| CDA<br>Additional Brake Arm | CDA |
| EEVO<br>Additional Brake Arm | LIVC |
| EEVO<br>Additional Brake Arm | LIVC |
| EEVO<br>Additional Brake Arm | LIVC |

VALVETRAIN WITH VARIABLE VALVE ACTUATION

CROSS-REFERENCE TO RELATED APPLICATIONS

This application is a continuation of International Application No. PCT/US2017/029486 filed Apr. 25, 2017, which claims the benefit of U.S. Provisional Patent Application No. 62/327,144 filed on Apr. 25, 2016 and U.S. Provisional Patent Application No. 62/330,517 filed on May 2, 2016, the contents of which are incorporated herein by reference.

FIELD

The present disclosure relates generally to switching valvetrain systems.

BACKGROUND

Combustion cycles on four-stroke internal combustion engines can be modified to achieve various desired results such as improved fuel economy. In one method, the expansion stroke is increased relative to the compression stroke. The effect is sometimes referred to as a Miller Cycle or as an Atkinson Cycle. The Miller and Atkinson Cycles can be achieved by either closing the intake valve earlier than a normal or Otto Cycle ("Base") with a shorter than normal intake valve lift duration ("EIVC"), or by closing the intake valve later by a longer than normal intake valve lift profile ("LIVC"). See FIG. 1 (Prior Art).

Various systems have been developed for altering the valve-lift characteristics for internal combustion engines. Such systems, commonly known as variable valve timing (VVT) or variable valve actuation (WA), improve fuel economy, reduce emissions, and improve drive comfort over a range of speeds.

Discrete variable valve lift can be obtained through the use of switching rocker arm technology. Switching roller finger followers or switching rocker arms allow for control of valve actuation by alternating between latched and unlatched states, usually involving an inner arm and an outer arm. In some circumstances, these arms engage different cam lobes, such as low-lift lobes, high-lift lobes, and no-lift lobes. Mechanisms are required for switching rocker arm modes in a manner suited for operation of internal combustion engines.

SUMMARY

A method of providing a rocker arm set for a valvetrain includes providing a first intake rocker arm, a second intake rocker arm and a first exhaust rocker arm. The first intake rocker arm is configured as a switching rocker arm for a first intake valve on a first cylinder. The second intake rocker arm is for a second intake valve on a second cylinder. The second rocker arm is configured to operate in a normal Otto cycle mode. The first exhaust rocker arm is provided for a first exhaust valve on the second cylinder. The first intake rocker arm operates in one of an LIVC or EIVC mode where the first intake rocker arm is configured to open or close at a different time compared to the second intake valve. The first exhaust rocker arm operates in a cylinder deactivation mode.

According to other features, the first intake valve is operated in a late intake valve closing mode (LIVC) wherein the first intake rocker arm closes the first intake valve later than the second intake valve. In another configuration, the first intake valve is operated in an early intake valve closing mode (EIVC) wherein the first intake rocker arm opens the first intake valve earlier than the second intake valve. A third and fourth intake rocker arm are provided. A second exhaust rocker arm is provided. The third rocker arm is configured as a switching rocker arm for a third intake valve on a third cylinder. The fourth intake rocker arm is configured to operate in a normal Otto cycle mode on a fourth cylinder. The second exhaust rocker arm is provided for a second exhaust valve on a fourth cylinder. The third intake rocker arm operates in a Miller cycle where the third intake rocker arm is configured to open or close the third intake valve at a different time than the fourth intake valve. The second exhaust rocker arm operates in a cylinder deactivation mode. The Miller cycle can comprise LIVC wherein the third intake rocker arm closes the third intake valve later than the fourth intake valve. The Miller cycle can alternatively comprise EIVC wherein the third intake rocker arm opens the third intake valve earlier than the fourth intake valve.

According to additional features, the third intake rocker arm further operates to add motion to EIVC resulting in normal Otto cycle. An added motion exhaust rocker arm can be provided that selectively operates in an engine braking mode. At least one of the first intake valve, the second intake valve and the first exhaust valve can be opened during a complete cycle duration while running cylinder cutout. The first intake rocker arm can be switched from a normal mode to LIVC mode on a downward slope of a cam that engages the first intake rocker arm such that a LIVC mode valve lift closing is extended relative to a normal mode valve lift closing. The rocker arm set can be provided on one of a Type II or Type III dual overhead camshaft layout diesel engine. A valve bridge can extend between the first and second intake valves, wherein added motion is applied to only one side of the valve bridge.

A method of providing a rocker arm set for a valvetrain according to other features is disclosed. A first intake rocker arm is provided that is configured as a switching rocker arm for a first intake valve on a first cylinder. The first intake rocker arm is configured to selectively operate in a late intake valve closing mode (LIVC). A second intake rocker arm is provided that is configured for a switching rocker arm for a second intake valve on a second cylinder. The second intake rocker arm is configured to selectively operate in an early intake valve closing mode (EIVC). A first exhaust rocker arm is provided for a first exhaust valve on a third cylinder. The rocker arm set is configured to selectively and alternatively operate in a first mode and a second mode. In the first mode, the first intake rocker arm operates in LIVC while the first exhaust rocker arm operates in cylinder deactivation mode. In the second mode, the second intake rocker arm operates in EIVC while the first exhaust rocker arm operates in cylinder deactivation mode.

According to other features, the rocker arm set is configured to operate in the first mode during high speed and medium load operating conditions. The rocker arm set is configured to operate in the second mode during low to medium speed and low load operating conditions. A third intake rocker arm is provided that is configured as a switching rocker arm for a third intake valve on a third cylinder. The third intake rocker arm is configured to selectively operate in a late intake closing mode (LIVC). In the first mode, the third intake rocker arm operates in LIVC.

In other features, a fourth intake rocker arm is provided that is configured as a switching rocker arm for a fourth intake valve on a fourth cylinder. The fourth intake rocker arm is configured to selectively operate in an early intake valve closing mode (EIVC). In the second mode, the fourth intake rocker arm operates in EIVC to normal mode for added motion. The rocker arm set is provided on an overhead camshaft layout engine. The rocker arm set is provided on one of a Type II and Type III dual overhead camshaft layout diesel engine.

A rocker arm set configured for a valvetrain on an overhead cam engine includes a first intake rocker arm, a second intake rocker arm and a first exhaust valve. The first intake rocker arm is configured on a first intake valve on a first cylinder of the engine. The second intake rocker arm is configured as a switching rocker arm on a second cylinder of the engine. The second intake rocker arm is configured to operate in a Miller cycle where the second intake rocker arm is configured to one of open and close at a different time compared to the first intake valve. The first exhaust rocker arm is for a first exhaust valve on a cylinder of the engine. The first exhaust rocker arm is configured to selectively operate in a cylinder deactivation mode. The Miller cycle can comprise a late intake valve closing mode (LIVC) wherein the second intake rocker arm closes the second intake valve later than the first intake valve.

A third intake rocker arm can be configured as a switching rocker arm for a third intake valve on a third cylinder. A fourth intake rocker arm can be configured to operate in a normal Otto cycle mode on a fourth cylinder. A second exhaust rocker arm can be provided for a second exhaust valve on the fourth cylinder. The third intake rocker arm is configured to operate in a Miller cycle where the third intake rocker arm is configured to open or close the third intake valve at a different time than the fourth intake valve. The second exhaust rocker arm is configured to operate in a cylinder deactivation mode.

In other features, the rocker arm set can further include an added motion exhaust rocker arm that selectively operates in an engine braking mode. The rocker arm set can be provided on a Type III dual overhead camshaft layout diesel engine.

A rocker arm set for a valvetrain on an overhead cam engine can include a first intake rocker arm, a second intake rocker arm and a first exhaust rocker arm. The first intake rocker arm is configured as a switching rocker arm for a first intake valve on a first cylinder. The first intake rocker arm is configured to selectively operate in a late intake valve closing mode (LIVC). The second intake rocker arm is configured as a switching rocker arm for a second intake valve on a second cylinder. The second intake rocker arm is configured to selectively operate in an early intake valve closing mode (EIVC). The first exhaust rocker arm is provided for a first exhaust valve on a third cylinder. The rocker arm set is configured to selectively and alternatively operate in a first mode and a second mode. In the first mode, the first intake rocker arm operates in LIVC while the first exhaust rocker arm operates in cylinder deactivation mode. In the second mode the second intake rocker arm operates in EIVC while the first exhaust rocker arm operates in cylinder deactivation mode.

In other features, the rocker arm set is configured to operate in the first mode during high speed and medium load operating conditions. The rocker arm set is configured to operate in the second mode during low to medium speed and low load operating conditions. The rocker arm set can further include a third intake rocker arm configured as a switching rocker arm for a third intake valve on a third cylinder. The third intake rocker arm is configured to selectively operate in a late intake valve closing mode (LIVC). In the first mode, the third intake rocker arm is configured to operate in LIVC. The rocker arm set can further include a fourth intake rocker arm configured as a switching rocker arm for a fourth intake valve on a fourth cylinder. The fourth intake rocker arm is configured to selectively operate in an early intake valve closing mode (EIVC). In the second mode, the fourth intake rocker arm is configured to operate in EIVC. The rocker arm set is configured for use on a Type III dual overhead camshaft layout diesel engine.

A rocker arm set for a valvetrain configured for an overhead cam engine according to another example of the present disclosure includes a plurality of first intake rocker arms each configured as a switching rocker arm for a respective intake valve on a respective plurality of cylinders. The first intake rocker arms are configured to selectively operate in one of late intake valve closing mode (LIVC) and early intake valve closing mode (EIVC). A second intake rocker arm selectively opens an intake valve of the respective intake valves. A plurality of first exhaust rocker arms are each configured for a respective plurality of first exhaust valves on respective plurality of first cylinders. The plurality of first exhaust rocker arms are configured to selectively operate in cylinder deactivation mode. A plurality of second exhaust rocker arms are each configured for a respective plurality of second exhaust valves on respective plurality of second cylinders, the plurality of second exhaust rocker arms configured to selectively operate in engine braking mode.

According to additional features, cylinder deactivation mode and engine braking mode are selectively and alternatively performed on a common cylinder of the first and second cylinders. The plurality of first intake rocker arms are configured for use on all cylinders of the overhead cam engine. The plurality of first exhaust rocker arms are configured for use on less than half of all of the cylinders of the overhead cam engine. The plurality of second exhaust rocker arms are configured for use on all cylinders of the overhead cam engine. The plurality of first intake rocker arms are configured as switching rocker arms that selectively operate between a default normal valve lift mode and the one of the LIVC and EIVC modes. The plurality of first exhaust rocker arms are configured as switching rocker arms that selectively operate between a default normal valve lift mode and the cylinder deactivation mode. The plurality of second exhaust rocker arms are configured as switching rocker arms that selectively operate between a valve closed position and an engine braking position.

A rocker arm set for a valvetrain configured for an overhead cam engine according to another example of the present disclosure includes a plurality of first intake rocker arms each configured as a switching rocker arm for a respective intake valve on a respective plurality of cylinders. The first intake rocker arms are configured to selectively operate in cylinder deactivation mode. A plurality of second intake rocker arms are configured as a switching rocker arm for a respective plurality of second intake valves on a respective plurality of second cylinders, the second intake rocker arms configured to selectively operate in late intake valve closing mode (LIVC). A plurality of first exhaust rocker arms are each configured for a respective plurality of first exhaust valves on respective plurality of first cylinders. The plurality of first exhaust rocker arms are configured to selectively operate in cylinder deactivation mode. A plurality of second exhaust rocker arms are each configured for a respective plurality of second exhaust valves on respective plurality of second cylinders, the plurality of second exhaust rocker arms configured to selectively operate in an early exhaust valve opening (EEVO) mode.

In other features, the plurality of first cylinders comprises a first half of the engine and the plurality of second cylinders comprises a second half of the engine.

A rocker arm set for a valvetrain configured for an overhead cam engine according to another example of the present disclosure includes a plurality of first intake rocker arms each configured as a switching rocker arm for a respective intake valve on a respective plurality of cylinders. The first intake rocker arms are configured to selectively operate in one of late intake valve closing mode (LIVC) and early intake valve closing mode (EIVC). A plurality of second intake rocker arms are configured as a switching rocker arm for a respective plurality of second intake valves on a respective plurality of second cylinders. The second intake rocker arms are configured to selectively operate in late intake valve closing mode (LIVC). A plurality of first exhaust rocker arms are each configured as switching rocker arms for a respective plurality of first exhaust valves on the respective plurality of first cylinders. The plurality of first exhaust rocker arms are configured to selectively operate in cylinder deactivation mode. A plurality of second exhaust rocker arms are each configured as switching rocker arms for a respective plurality of second exhaust valves on the respective plurality of second cylinders. The plurality of second exhaust rocker arms configured to selectively operate in an early exhaust valve opening (EEVO) mode.

In other features, the plurality of first cylinders comprises a first half of the engine and the plurality of second cylinders comprises a second half of the engine.

A rocker arm set for a valvetrain configured for an overhead cam engine according to another example of the present disclosure includes a plurality of first intake rocker arms each configured as a switching rocker arm for a respective intake valve on a respective plurality of cylinders. The first intake rocker arms are configured to selectively operate in one of late intake valve closing mode (LIVC) and early intake valve closing mode (EIVC). A plurality of second intake rocker arms are configured to selectively operate in cylinder deactivation mode. A plurality of first exhaust rocker arms are each configured for a respective plurality of first exhaust valves on respective plurality of first cylinders. The plurality of first exhaust rocker arms are configured to selectively operate in cylinder deactivation mode.

In other features, a plurality of second exhaust rocker arms are each configured for respective plurality of second exhaust valves and configured for selective operation in engine braking mode. The plurality of second intake rocker arms are configured with hydraulic lash adjusters. The plurality of first exhaust rocker arms are configured with hydraulic lash adjusters.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As will become appreciated from the following discussion, the present disclosure provides an advanced valvetrain system based on an overhead camshaft layout. A combustion strategy described as Miller cycle or Atkinson cycle can be achieved by closing the intake valve early or late relative to what is described as Otto cycle. In this way, a discrete variable valve lift (DVVL) method can be used on intake valves to maximize the performance of an engine configured with early or late intake valve closing (EIVC or LIVC). Miller cycling can enable higher brake thermal efficiencies by altering the effective engine compression ratio using either EIVC or LIVC. Additionally, engine braking is provided that enables the ability to slow the vehicle and offers opportunities for regenerative braking to charge hybrid battery packs. LIVC can be accomplished via added motion to a normal valve event. A normal valve event can be accomplished via added motion to the EIVC event.

Accordingly, variable valve actuation is provided that enables Miller cycling, enables engine braking on all cylinders and enables variable valve actuation on half of the engine cylinders. Deactivation of the exhaust valves in conjunction with holding open at least one intake valve per cylinder (half of the engine) where the intake valve remains partially open the entire duration. In this regard, some systems described herein utilize a LIVC strategy on one valve of a two-intake valve system (commonly called a 4-valve head with two intake and two exhaust valves per cylinder). Engine braking and deactivation can be incorporated on other valves as will be described herein.

Figure 1:
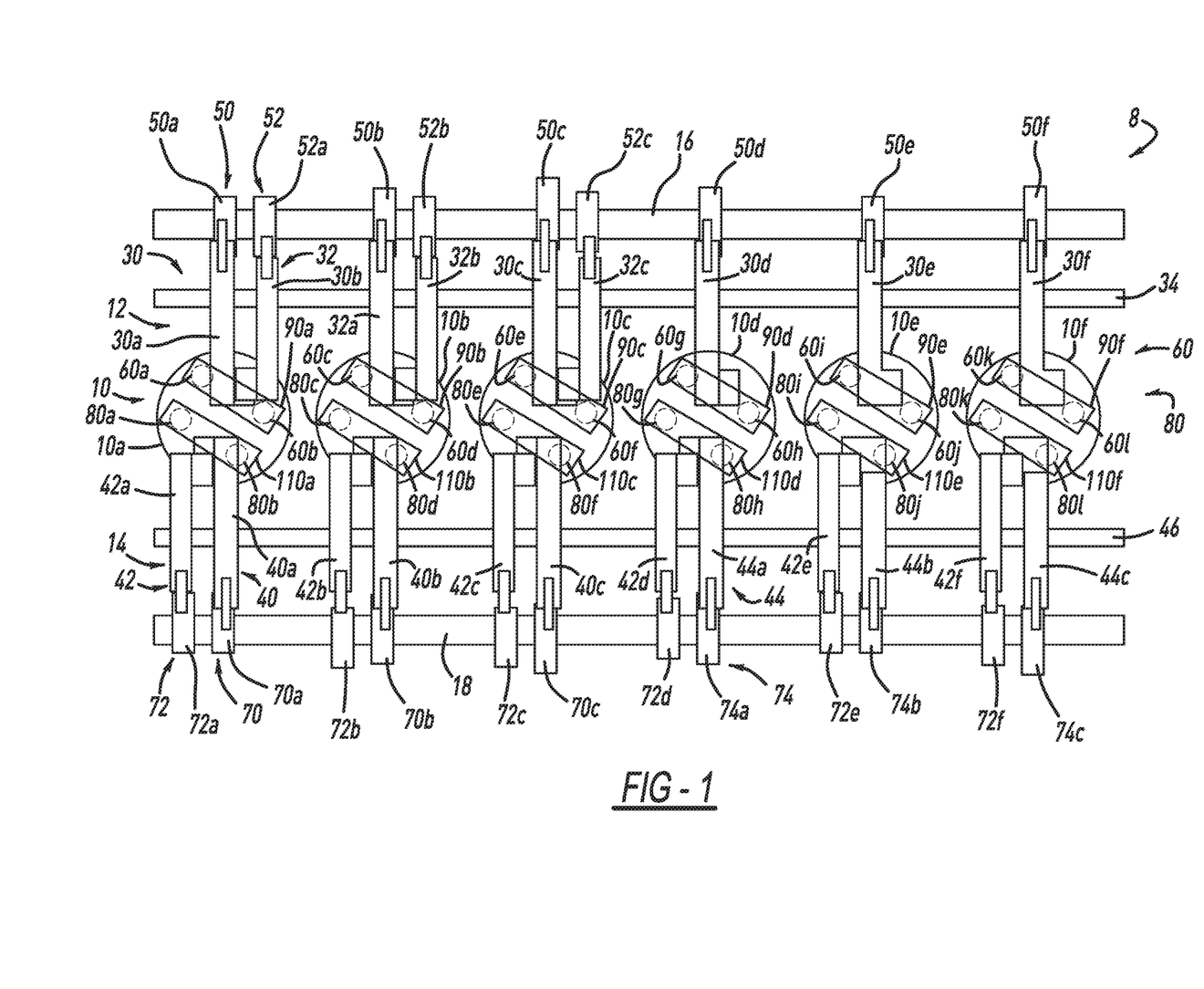
FIG. 1 is a schematic illustration of a valve train assembly constructed in accordance to one example of the present disclosure.

With initial reference to FIG. 1, a valve train assembly 8 constructed in accordance to one example of the present disclosure is shown and generally identified at reference 8.

The valve train assembly 8 is a Type III valve train and can be configured for use in an engine having six cylinders collectively referred to at reference numeral 10 and individually identified at reference numerals 10a, 10b, 10c, 10d, 10e, and 10f. In one example, the engine architecture can have a parallel turbocharger. However, it will be appreciated that the present teachings are not so limited. In this regard, the present disclosure may be used in any valve train assembly and can further be adapted for use in engines having different amounts of cylinders. The valve train assembly 10 can include a series of intake rocker arm valve assemblies 12 and a series of exhaust rocker arm valve assemblies 14. An intake camshaft 16 can be operably associated with the intake rocker arm valve assemblies 12, and an exhaust camshaft 18 can be operably associated with the exhaust rocker arm valve assemblies 14. The camshafts 16, 18 can rotate, for example, based on a rotatable input from a timing chain or belt linkage connected to a crankshaft of the engine (not shown).

The intake rocker arm assemblies 12 can include first intake rocker arms, collectively identified at reference 30 and second intake rocker arms, collectively identified at reference 32. The intake rocker arm assemblies 12 are mounted for rotation about an intake rocker shaft 34. The first intake rocker arms 30 are individually identified at reference 30a, 30b, 30c, 30d, 30e and 30f. The second intake rocker arms 32 are individually identified at reference 32a, 32b and 32c.

The exhaust rocker arm assemblies 14 can include first exhaust rocker arms, collectively identified at reference 40, second exhaust rocker arms, collectively identified at reference 42 and third exhaust rocker arms, collectively identified at reference 44. The exhaust rocker arm assemblies 14 are mounted for rotation about an intake rocker shaft 46. The first exhaust rocker arms 40 are individually identified at reference 40a, 40b and 40c. The second exhaust rocker arms 42 are individually identified at reference 42a, 42b, 42c, 42d, 42e and 42f. The third exhaust rocker arms 44 are individually identified at reference 44a, 44b and 44c.

The first intake rocker arms 30 are configured for operation with a lobed cam assembly, collectively identified at reference 50 and individually identified at reference 50a, 50b, 50c, 50d, 50e and 50f. The second intake rocker arms 32 are configured for operation with a lobed cam assembly, collectively identified at reference 52 and individually identified at reference 52a, 52b and 52c. The intake valve assembly 12 includes intake valves collectively identified at reference 60 and individually identified at reference 60a, 60b, 60c, 60d, 60e, 60f, 60g, 60h, 60i, 60j, 60k and 60l.

The first exhaust rocker arms 40 are configured for operation with a lobed cam assembly, collectively identified at reference 70 and individually identified at reference 70a, 70b and 70c. The second exhaust rocker arms 42 are configured for operation with a lobed cam assembly, collectively identified at reference 72 and individually identified at reference 72a, 72b, 72c, 72d, 72e and 72f. The third exhaust rocker arms 44 are configured for operation with a lobed cam assembly, collectively identified at reference 74 and individually identified at reference 74a, 74b and 74c. The exhaust valve assembly 14 includes exhaust valves collectively identified at reference 80 and individually identified at reference 80a, 80b, 80c, 80d, 80e, 80f, 80g, 80h, 80i, 80j, 80k and 80l.

Intake valve bridges, collectively identified at 90 are provided on the intake valve assembly 12 and are configured to generally cooperate with the first intake rocker arms 30. The intake valve bridges 90 are individually identified at reference 90a, 90b, 90c, 90d, 90e and 90f. The intake valve bridge 90 is configured to press down on intake valves 60 based on the rocker arm 30 being rotated by cam assemblies 50. In other configurations the intake valve bridges 90 may be eliminated whereby the rocker arms engage directly the corresponding valves.

Exhaust valve bridges, collectively identified at 110 are provided on the exhaust valve assembly 14 and are configured to generally cooperate with the first and third exhaust rocker arms 40 and 44. The exhaust valve bridges 110 are individually identified at reference 110a, 110b, 110c, 110d, 110e and 110f. The exhaust valve bridge 110 is configured to press down on exhaust valves 80 based on the rocker arms 40 and 44 being rotated by cam assemblies 70 and 74. In other configurations the exhaust valve bridges 110 may be eliminated whereby the rocker arms engage directly the corresponding valves.

In one method of operation, the second intake rocker arms 32 hold the intake valves 60a-60f open on half of the engine (e.g. cylinders 10a-10c) while the other half (e.g. cylinders 10d-10f) produces power. The strategy provides operational benefits over prior art configuration as the exhaust heat is higher when firing three cylinders at low load as compared to six cylinders. The after treatment can therefore operate closer to its sweet spot for NOx efficiency. In addition, leaving the intake valves open can reduce the piston ring-pack friction resulting in reduced parasitic losses and better fuel economy.

Figure 2:
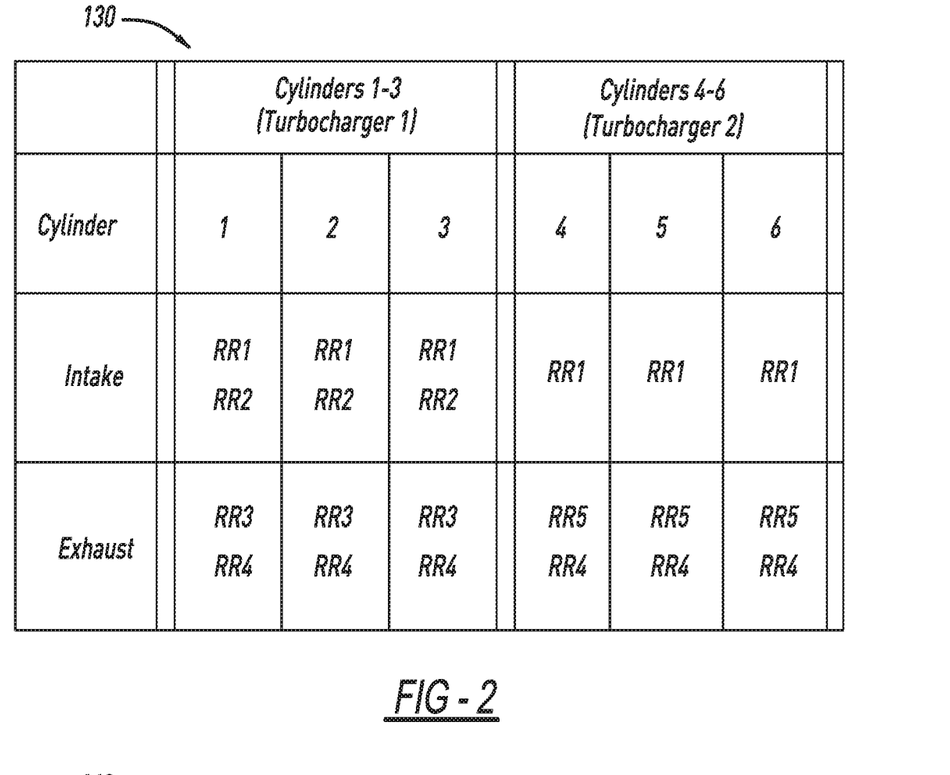
FIG. 2 is a table illustrating a proposed rocker arm configuration of VVA according to the present disclosure.
Figure 3:
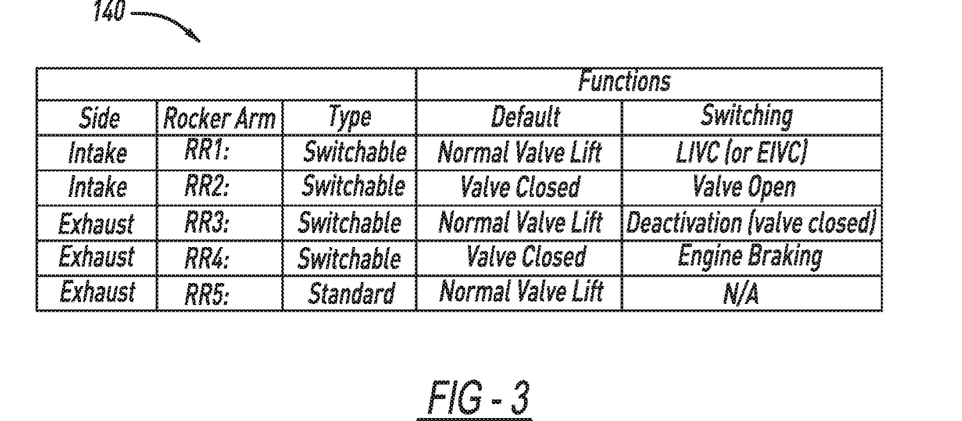
FIG. 3 is a table defining the rocker arms used in the table shown in FIG. 2.

The valve train assembly 8 provides an optimized fuel economy package. With additional reference now to FIG. 2, a rocker arm configuration according to the present disclosure is shown in table 130. FIG. 3 illustrates functions of the rocker arms shown in FIG. 2 and generally identified at reference 140. As shown in FIGS. 2 and 3, the intake side includes integrating first intake rocker arms 30 (RR1) on all cylinders 10a-10f while adding second intake rocker arms 32 (RR2) on cylinders 10a-10c. The first intake rocker arms 30 is switchable and can function to selectively and alternatively provide (i) normal valve lift profile to LIVC and (ii) EIVC to normal for added motion. In other examples, RR1 can be lost motion for EIVC.

The second intake rocker arms 32 provide added motion. The second intake rocker arm 32 is switchable and can function to selectively and alternatively provide (i) valve closed and (ii) valve open. A valve open mode therefore can be provided by RR2. A valve open is defined as at least one valve being at least partially open 100% of the time while in an operating mode corresponding to no fueling in the cylinder. RR2 is added motion and is illustrated on top of RR1.

The exhaust side includes integrating first exhaust rocker arms 40 (RR3) on cylinders 10a-10c, second exhaust rocker arms 42 (RR4) on all cylinders 10a-10f and third exhaust rocker arms 44 (RR5) on cylinders 10d-10f. The first exhaust rocker arms 40 are switchable and can function to selectively and alternatively provide (i) normal valve lift profiles and (ii) cylinder deactivation profiles. As used herein cylinder deactivation is used to denote all valves closed and fuel cut off. Cylinder cutout is used to denote fuel cut off. The second exhaust rocker arms 42 are switchable and can function to selectively and alternatively provide (i) valve closed and (ii) engine braking. The RR4 provides added motion and is illustrated on top of RR3. RR4 is also illustrated on top of normal lift exhaust RR5 for added motion for braking. The third exhaust rocker arms 44 are standard (non-switching) rocker arms and provide normal valve lift profiles. In this example, RR3 operates in the deactivated mode with RR2 providing valve open condition. Select rocker arms disclosed herein can be configured as switching rocker arms. The switching rocker arms can be configured as switching roller finger followers (SRFF). The SRFF's can be configured for discrete operation in one of a low-lift mode and a high-lift mode. A select rocker arm can be switched from the normal mode to a LIVC mode on a downward slope of the cam such that a LIVC mode valve lift closing is extended relative to a normal valve lift closing.

According to the present disclosure, one or more cylinders can have rocker arms configured to operate in cylinder deactivation while having another cylinder operate in LIVC. It will be appreciated that a cylinder operating with LIVC will be distinct from a cylinder operating in cylinder deactivation. It will be appreciated that this strategy can be implemented in one cylinder or more than one cylinder of the engine. In some configurations LIVC and cylinder deactivation can be provided on a common cylinder such that cylinder deactivation can be used when it is desirable to operate in cylinder deactivation but when it is not desirable to operate in cylinder deactivation, the cylinder can be operated in normal or LIVC mode. The same strategies can be implemented for EIVC where LIVC is described above. In other examples configurations may be provided that allow both EIVC and LIVC. It will be appreciated that EIVC and LIVC would not be operated concurrently. Instead, it may be desirable to operate LIVC at high speed and medium load conditions (for example cylinders 4-6), while operating EIVC at low speed and low load conditions (for example on cylinders 1-3).

Figure 4:
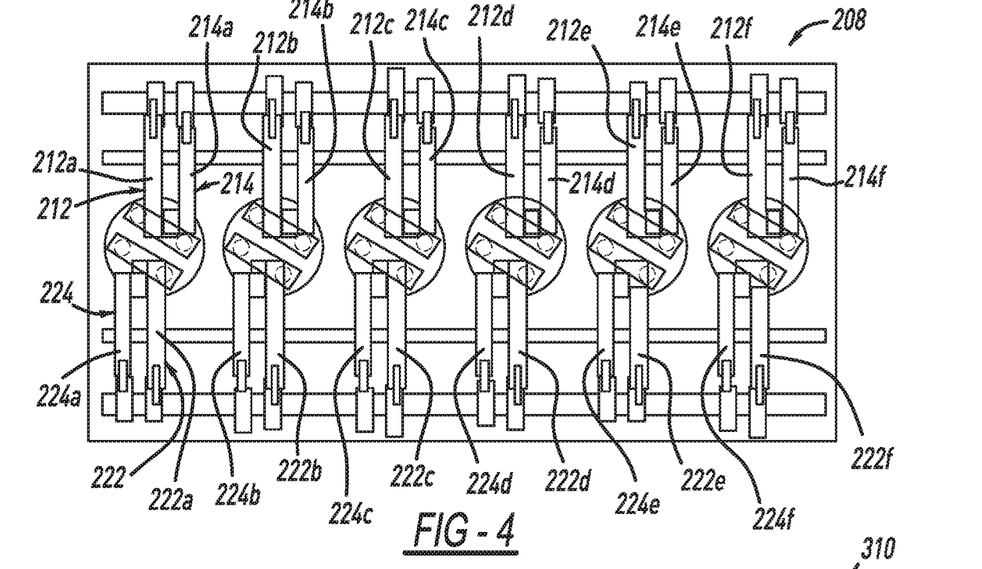
FIG. 4 is a schematic illustration of a valve train assembly constructed in accordance to another example of the present teachings.

With reference now to FIG. 4, a valve train assembly constructed in accordance to another example of the present disclosure is shown and generally identified at reference 208. Unless otherwise described, the valve train assembly 208 is constructed similarly to the valve train assembly 8 described above. The valve train assembly 208 includes a plurality of first intake rocker arms, collectively identified at 212, a plurality of second intake rocker arms, collectively identified at 214, a plurality of first exhaust rocker arms, collectively identified at 222 and a plurality of second exhaust rocker arms, collectively identified at 224. The first intake rocker arms 212 are individually identified at 212a-212f. The second intake rocker arms 214 are individually identified at 214a-214f. The first exhaust rocker arms 222 are individually identified at 222a-222f. The second exhaust rocker arms 224 are individually identified at 224a-224f. According to various implementations of the present disclosure, the plurality of first intake rocker arms 212 and the plurality of first exhaust rocker arms 222 are configured as standard rocker arms. The plurality of first exhaust rocker arms 214 and the plurality of second exhaust rocker arms 224 are configured as added motion rocker arms.

Figure 5:
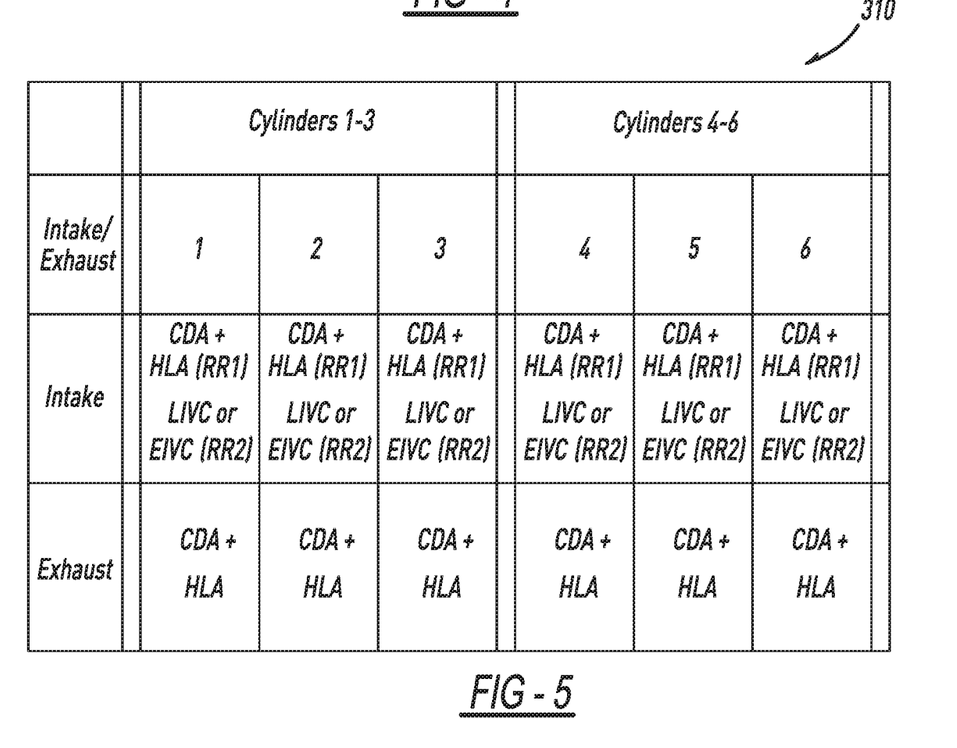
FIG. 5 is a table illustrating another proposed rocker arm configuration having a diesel WA system with switchable VVA functions on the front and rear half of the engine with switchable VVA functions on the intake and exhaust.

With additional reference now to FIG. 5, a rocker arm configuration according to another example of the present disclosure is shown in table 310. The intake side includes configuring the first intake rocker arms 212 with cylinder deactivation capability and hydraulic lash adjusters (HLA). The second intake rocker arms 214 are configured for operation in one of LIVC or EIVC. The exhaust side includes configuring the first exhaust rocker arms 222 with cylinder deactivation capability and HLAs. In the configuration shown in table 310, the second exhaust rocker arms 224 shown in FIG. 4 are not needed.

Figures 6, 7:
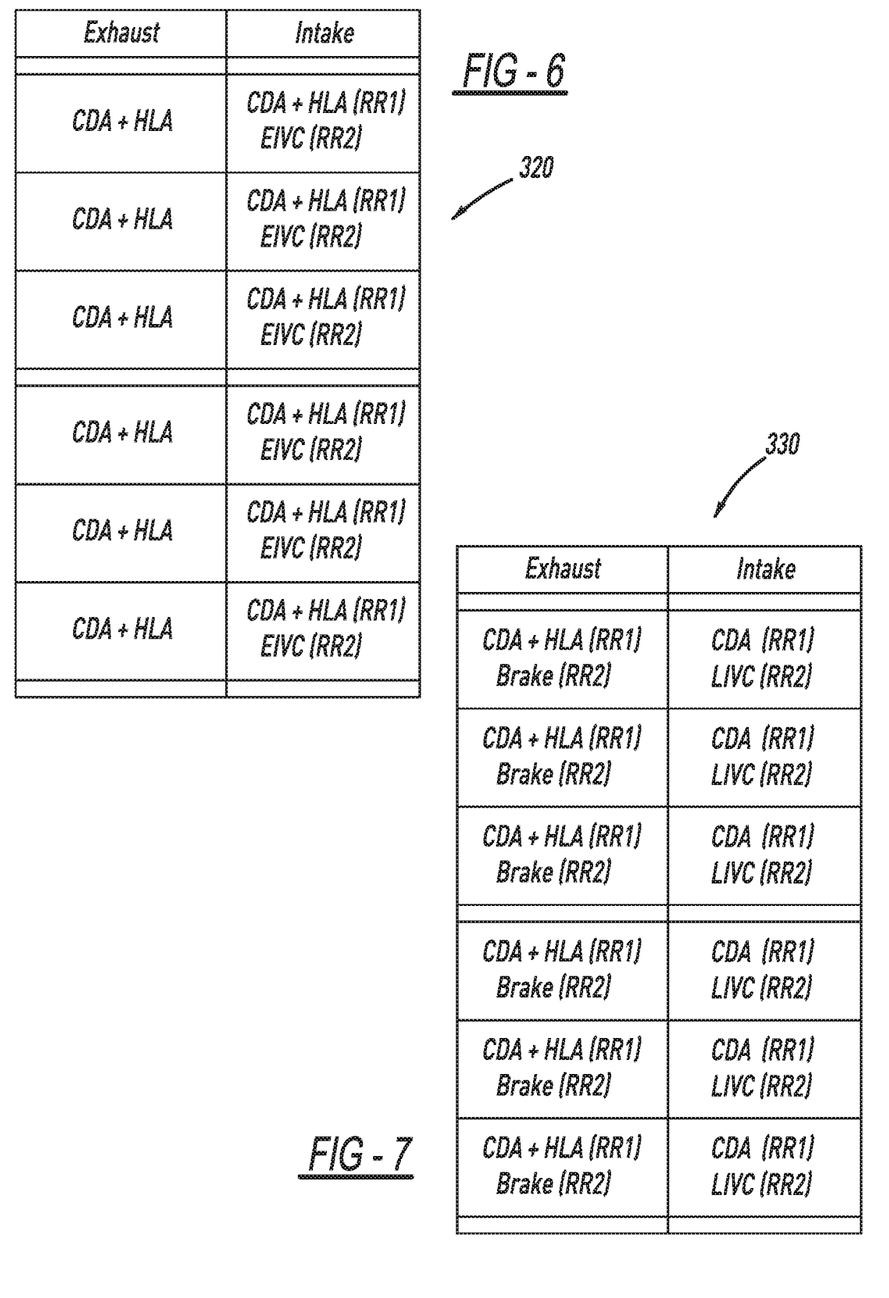
FIG. 6 is a table illustrating another rocker arm configuration implementing EIVC according to another example of the present disclosure.
FIG. 7 is a table illustrating another rocker arm configuration implementing LIVC according to another example of the present disclosure.

With reference to FIG. 6, a rocker arm configuration according to another configuration according to another example of the present disclosure is shown in table 320. The exhaust side includes configuring the first exhaust rocker arms 222 with cylinder deactivation capability and hydraulic lash adjusters (HLA). The intake side includes configuring the first intake rocker arms 212 with cylinder deactivation capability and HLAs. The second intake rocker arms 214 are configured for selective operation in EIVC. In the configuration shown in table 320, the second exhaust rocker arms 224 shown in FIG. 4 are not needed.

With reference to FIG. 7, a rocker arm configuration according to another configuration according to another example of the present disclosure is shown in table 330. The exhaust side includes configuring the first exhaust rocker arms 222 with cylinder deactivation capability and hydraulic lash adjusters (HLA). The second exhaust rocker arms 224 are configured for selective engine braking operation. The intake side includes configuring the first intake rocker arms 212 with cylinder deactivation capability and HLAs. The second intake rocker arms 214 are configured for selective operation in LIVC.

Figures 8, 9:
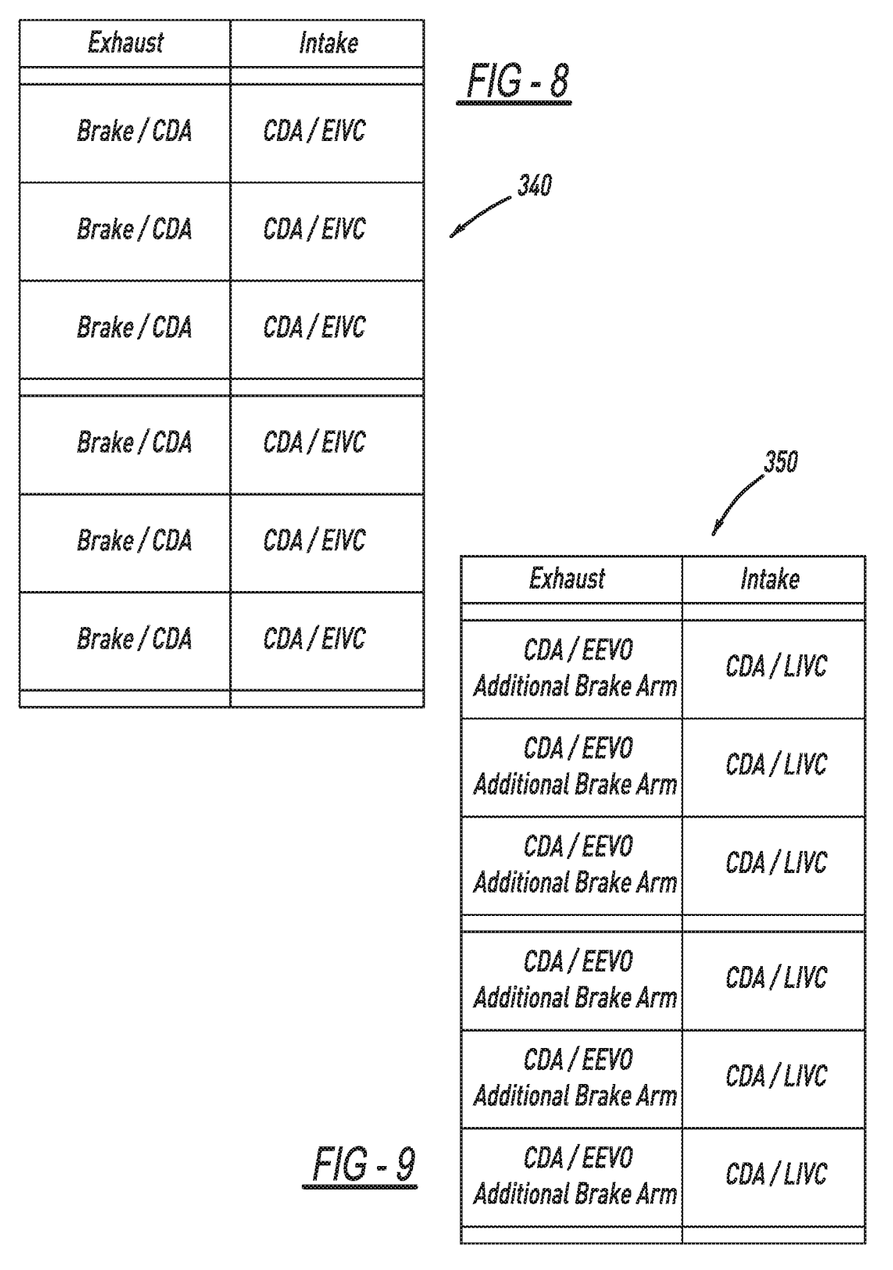
FIG. 8 is a table illustrating another rocker arm configuration implementing EIVC according to another example of the present disclosure.
FIG. 9 is a table illustrating another rocker arm configuration implementing added motion on at least one exhaust valve per cylinder for early exhaust valve opening (EEVO) while a separate brake is used for added motion for the brake plus cylinder deactivation according to another example of the present disclosure.

With reference to FIG. 8, a rocker arm configuration according to another configuration according to another example of the present disclosure is shown in table 330. The exhaust side includes configuring the first exhaust rocker arms 222 with cylinder deactivation capability. The second exhaust rocker arms 224 are configured for selective engine braking operation. The intake side includes configuring the first intake rocker arms 212 with cylinder deactivation capability and HLAs. The second intake rocker arms 214 are configured for selective operation in EIVC.

With reference to FIG. 9, a rocker arm configuration according to another configuration of the present disclosure is shown in table 350. The exhaust side includes configuring the first exhaust rocker arms 222 to selectively operate in cylinder deactivation mode. The second exhaust rocker arms 224 are configured for selective early exhaust valve opening (EEVO) operation. The intake side includes configuring the first intake rocker arms 212 with cylinder deactivation capability. The second intake rocker arms 214 are configured for selective operation in LIVC. In various implementations, the CDA can be lost motion built into the first intake rocker arms 212 and first exhaust rocker arms 222. LIVC can be added motion pushing on the first intake rocker arms 212. In other arrangements, the second intake rocker arms 214 can be configured as EIVC going from EIVC to normal operation with added motion on top of the respective rocker arms. Furthermore, a combination of LIVC configured on some intake valves and EIVC configured on other intake valves. LIVC can be particularly suited for high speed engine operation while EIVC can be particularly suited for low speed engine operation.

Figure 10:
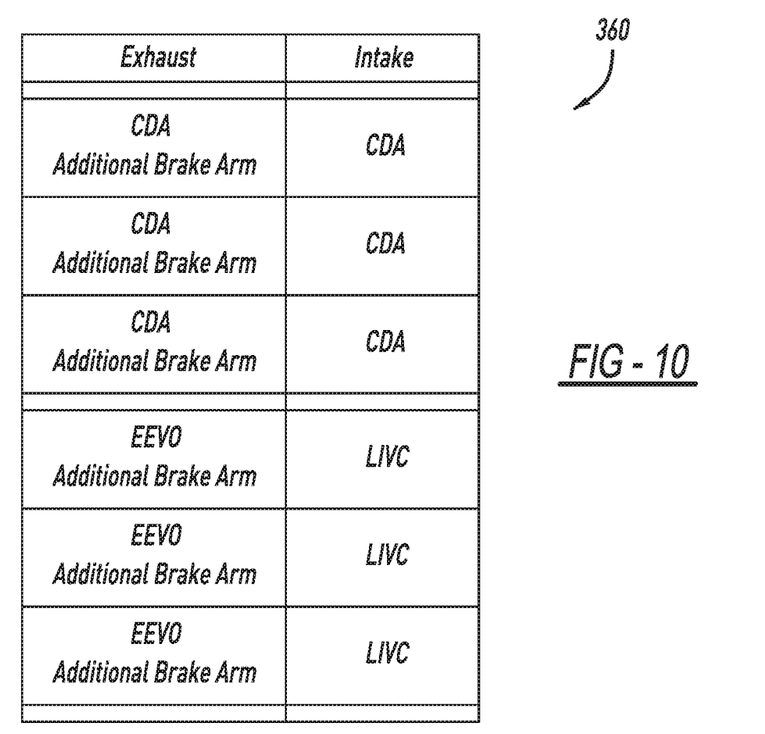
FIG. 10 is a table illustrating another rocker arm configuration that incorporates cylinder deactivation (CDA) on half of the engine and LIVC on the other half of the engine.

With reference to FIG. 10, a rocker arm configuration according to another configuration of the present disclosure is shown in table 360. The exhaust side includes configuring a first half of the first exhaust rocker arms 222 with CDA and a second half of the first exhaust rocker arms 222 with early exhaust valve opening (EEVO) operation. The intake side includes configuring a first half of the first intake rocker arms 212 with CDA and a second half of the first intake rocker arms 212 with LIVC. This configuration minimizes required hardware while maximizing performance results.

Figure 11:
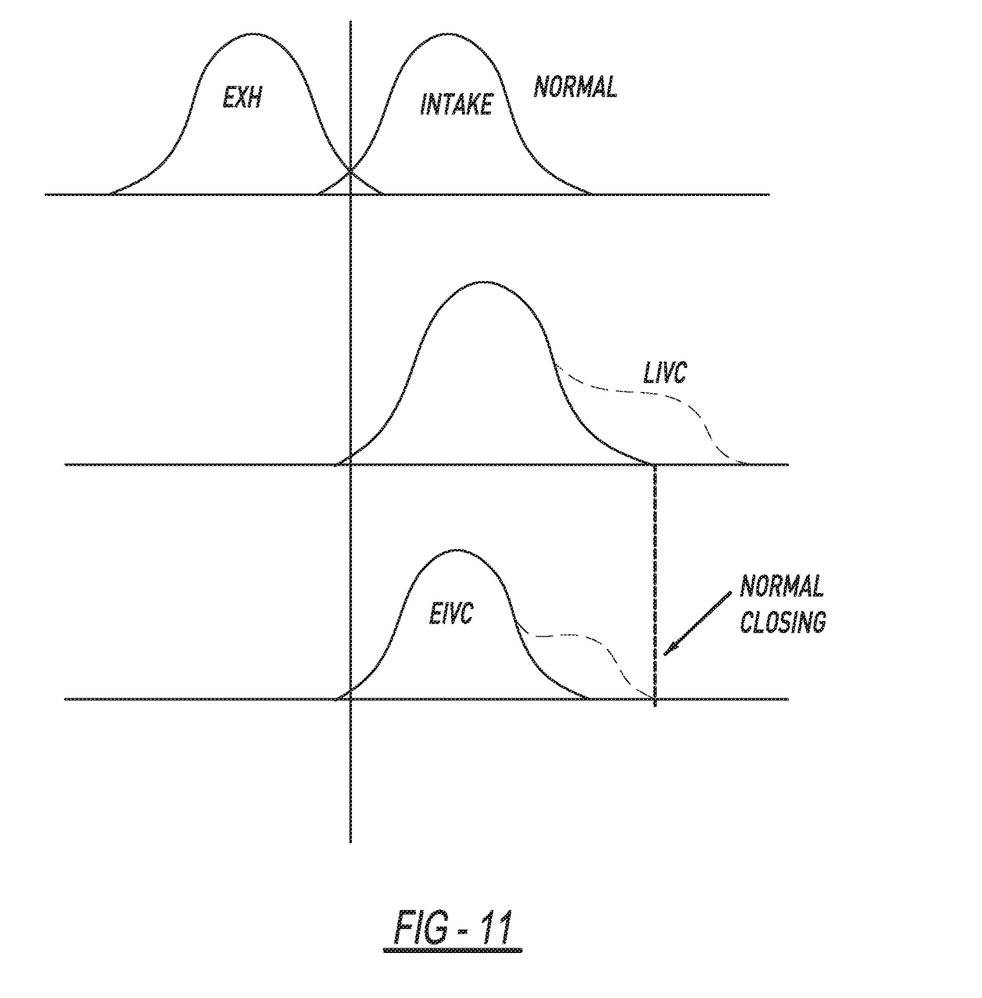
FIG. 11 is a plot illustrating normal valve operation, LIVC and EIVC according to one example of the present disclosure.

FIG. 11 illustrates lift (x-axis) versus time (y-axis) for normal valve operation, LIVC and EIVC. As illustrated EIVC is shown with added motion to close back at normal valve operation. In other words, a valve operating in EIVC mode with added motion will close at the same time as an intake valve operating in normal operation. It will be appreciated that while FIG. 11 illustrates a given lift, any lift may be incorporated within the scope of the present disclosure. In the example shown in FIG. 11, EIVC can provide normal duration with a distinct lift. It will further be appreciated that camshaft profiles may be altered to achieve higher lift if desired.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of providing a rocker arm set for a valvetrain having a plurality of cylinders, the method comprising:
   providing a first intake rocker arm configured as a switching rocker arm for a first intake valve on a first cylinder of the plurality of cylinders;
   providing a second intake rocker arm as a switching rocker arm for a second intake valve on the first cylinder, the second intake rocker arm selectively switchable between (i) a valve closed mode and (ii) a valve open mode;
   providing a first exhaust rocker arm for a first exhaust valve on a second cylinder of the plurality of cylinders; and
   wherein (i) the first intake rocker arm operates in one of a late intake valve closing mode (LIVC) and an early intake valve closing mode (EIVC), where the first intake rocker arm is configured to one of open and close the first intake valve at a different time compared to the second intake valve, and (ii) the first exhaust rocker arm operates in a cylinder deactivation mode when the first intake rocker arm operates in one of the LIVC mode and EIVC mode.

2. The method of claim 1, further comprising:
   providing a second exhaust rocker arm for a second exhaust valve on the first cylinder as a switchable added motion exhaust rocker arm that selectively operates between (i) a valve closed mode and (ii) an engine braking mode.

3. The method of claim 2, further comprising:
   providing a third exhaust rocker arm for a third exhaust valve on the first cylinder as a switching rocker arm switchable to provide (i) a normal valve lift mode, and (ii) a cylinder deactivation mode.

4. The method of claim 1, further comprising:
   opening at least one of the first intake valve, the second intake valve and the first exhaust valve during a complete cycle duration while running cylinder cutout.

5. The method of claim 1 wherein the first intake rocker arm is switched from a normal mode to the LIVC mode on a downward slope of a cam that engages the first intake rocker arm such that a LIVC mode valve lift closing is extended relative to a normal mode valve lift closing, and
   wherein the first intake rocker arm is switched from the EIVC mode lift profile to a normal valve lift profile on a downward slope of a cam that engages the first intake rocker arm such that the first intake valve closes at the same time as the normal mode valve lift closing.

6. The method of claim 1, wherein in the valve open mode, the second intake valve is at least partially open while in an operating mode corresponding to no fueling in the first cylinder.

7. The method of claim 1, wherein a first set of intake valves, which includes the first and second intake valves, associated with a first half of the plurality of cylinders are held open during operation, and a second set of intake valves associated with a second half of the plurality of cylinders produce power during the operation.

8. The method of claim 1, further comprising providing the first and second intake rocker arms without cylinder deactivation capability.

9. The method of claim 1, further comprising:
   providing a second exhaust rocker arm for a second exhaust valve on a third cylinder of the plurality of cylinders, the second exhaust rocker arm being a switching rocker arm switchable to provide (i) a valve closed mode, and (ii) an engine braking mode;
   providing a third exhaust rocker arm for a third exhaust valve on the third cylinder as a standard non-switching rocker arm that provides normal valve lift profiles.

10. The method of claim 1, further comprising:
    providing a third intake rocker arm as a switching rocker arm for a third intake valve on a third cylinder of the plurality of cylinders,
    wherein the third intake rocker arm is switchable between (i) a normal mode, and (ii) one of the LIVC mode and the EIVC mode, and
    wherein the third intake rocker arm and the third intake valve are the only intake rocker arm and intake valve on the third cylinder.

11. The method of claim 1, wherein the plurality of cylinders includes six cylinders, including a third, fourth, fifth and sixth cylinder, further comprising:
    providing each of the first, second, and third cylinders with:
      (a) the first intake rocker arm that selectively operates between (i) a normal mode and (ii) one of the LIVC mode and the EIVC mode;
      (b) the second intake rocker arm that selectively operates between (i) the valve closed mode and (ii) the valve open mode;
      (c) the first exhaust rocker arm as a switchable rocker arm that selectively operates between (i) a normal mode and (ii) a cylinder deactivation mode; and
      (d) a second exhaust rocker arm as a switchable added motion exhaust rocker arm that selectively operates between (i) a valve closed mode and (ii) an engine braking mode; and
    providing each of the fourth, fifth, and sixth cylinders with:
      (e) one of the first intake rocker arms;
      (f) one of the second exhaust rocker arms; and
      (g) a third exhaust rocker arm as a standard non-switching rocker arm that provides normal valve lift profiles.

12. A method of providing a rocker arm set for a valvetrain having a plurality of cylinders, the method comprising:
    providing a first intake rocker arm as a switching rocker arm for a first intake valve on a first cylinder of the plurality of cylinders, the first intake rocker arm selectively switchable between (i) a late intake valve closing mode (LIVC) and (ii) an early intake valve closing mode (EIVC);
    providing a second intake rocker arm as a switching rocker arm for a second intake valve on the first cylinder, the second intake rocker arm having a hydraulic lash adjuster (HLA) and selectively switchable between (i) a normal mode and (ii) a cylinder deactivation mode;

providing a third intake rocker arm as a switching rocker arm for a third intake valve on a second cylinder of the plurality of cylinders, the third intake rocker arm selectively switchable between (i) the LIVC mode and (ii) the EIVC mode;

providing a fourth intake rocker arm as a switching rocker arm for a fourth intake valve on the second cylinder, the fourth intake rocker arm having an HLA and selectively switchable between (i) a normal mode and (ii) a cylinder deactivation mode;

providing a first exhaust rocker arm for a first exhaust valve on a third cylinder of the plurality of cylinders, the first exhaust rocker arm having an HLA and selectively switchable between (i) a normal mode and (ii) a cylinder deactivation mode;

wherein the rocker arm set selectively and alternatively operates in (i) a first mode wherein the first intake rocker arm operates in the LIVC mode while the first exhaust rocker arm operates in the cylinder deactivation mode; and (ii) a second mode wherein the third intake rocker arm operates in the EIVC mode while the first exhaust rocker arm operates in the cylinder deactivation mode; and providing only a single exhaust rocker arm on each cylinder of the plurality of cylinders.

13. The method of claim 12 wherein the rocker arm set is configured to operate in the first mode during high speed and medium load operating conditions, and wherein the rocker arm set is configured to operate in the second mode during low to medium speed and low load operating conditions.

14. The method of claim 12, wherein the plurality of cylinders includes six cylinders, further comprising:
providing each of the six cylinders with the first and second intake rocker arms.

15. A method of providing a rocker arm set for a valvetrain having a plurality of cylinders, the method comprising:
providing a first intake rocker arm as a switching rocker arm for a first intake valve on a first cylinder of the plurality of cylinders, the first intake rocker arm selectively switchable only between (i) a normal mode and (ii) an early intake valve closing mode (EIVC);

providing a second intake rocker arm as a switching rocker arm for a second intake valve on the first cylinder, the second intake rocker arm having a hydraulic lash adjuster (HLA) and selectively switchable between (i) a normal mode and (ii) a cylinder deactivation mode;

providing a third intake rocker arm as a switching rocker arm for a third intake valve on a second cylinder of the plurality of cylinders, the third intake rocker arm selectively switchable only between (i) the normal mode and (ii) the EIVC mode;

providing a fourth intake rocker arm as a switching rocker arm for a fourth intake valve on the second cylinder, the fourth intake rocker arm having an HLA and selectively switchable between (i) a normal mode and (ii) a cylinder deactivation mode;

providing a first exhaust rocker arm for a first exhaust valve on a third cylinder of the plurality of cylinders, the first exhaust rocker arm having an HLA and selectively switchable between (i) a normal mode and (ii) a cylinder deactivation mode; and wherein the rocker arm set selectively and alternatively operates in (i) a first mode wherein the first intake rocker arm operates in the EIVC mode while the first exhaust rocker arm operates in the cylinder deactivation mode; and (ii) a second mode wherein the third intake rocker arm operates in the EIVC mode while the first exhaust rocker arm operates in the cylinder deactivation mode.

16. The method of claim 15, further comprising:
providing a second exhaust rocker arm for a second exhaust valve on the first cylinder, the second exhaust rocker arm selectively switchable between (i) a normal mode and (ii) a cylinder deactivation mode; and providing a third exhaust rocker arm for a third exhaust valve on the first cylinder, the third exhaust rocker arm selectively switchable between (i) a valve closed mode and (ii) and engine braking mode.

17. The method of claim 15, further comprising:
providing a second exhaust rocker arm with an HLA.

18. The method of claim 15, wherein the plurality of cylinders includes six cylinders, further comprising:
providing each of the six cylinders with the first and second intake rocker arms.

19. The method of claim 15, wherein the plurality of cylinders includes six cylinders, further comprising:
providing each of the third, fourth, fifth, and sixth cylinders with the first and second intake rocker arms; and
providing each of the six cylinders with the first exhaust rocker arm; and
providing each of the six cylinders with a second exhaust rocker arm selectively switchable between (i) a valve closed mode and (ii) and engine braking mode.

20. The method of claim 15, further comprising:
providing only a single exhaust rocker arm on each cylinder of the plurality of cylinders.

21. A method of providing a rocker arm set for a valvetrain having a plurality of cylinders, the method comprising:
providing a first intake rocker arm as a switching rocker arm for a first intake valve on a first cylinder of the plurality of cylinders, the first intake rocker arm selectively switchable only between (i) a late intake valve closing mode (LIVC) and (ii) a normal mode;

providing a second intake rocker arm as a switching rocker arm for a second intake valve on the first cylinder, the second intake rocker arm having a hydraulic lash adjuster (HLA) and selectively switchable between (i) a normal mode and (ii) a cylinder deactivation mode;

providing a third intake rocker arm as a switching rocker arm for a third intake valve on a second cylinder of the plurality of cylinders, the third intake rocker arm selectively switchable only between (i) the LIVC mode and (ii) the normal mode;

providing a fourth intake rocker arm as a switching rocker arm for a fourth intake valve on the second cylinder, the fourth intake rocker arm having an HLA and selectively switchable between (i) a normal mode and (ii) a cylinder deactivation mode;

providing a first exhaust rocker arm for a first exhaust valve on a third cylinder of the plurality of cylinders, the first exhaust rocker arm having an HLA and selectively switchable between (i) a normal mode and (ii) a cylinder deactivation mode; and wherein the rocker arm set selectively and alternatively operates in (i) a first mode wherein the first intake rocker arm operates in the LIVC mode while the first exhaust rocker arm operates in the cylinder deactivation mode; and (ii) a second mode wherein the third intake rocker arm operates in the LIVC mode while the first exhaust rocker arm operates in the cylinder deactivation mode.

22. The method of claim 21, wherein the plurality of cylinders includes six cylinders, further comprising:
- providing each of the third, fourth, fifth, and sixth cylinders with the first and second intake rocker arms; and
- providing each of the six cylinders with the first exhaust rocker arm; and
- providing each of the six cylinder with a second exhaust rocker arm selectively switchable between (i) a valve closed mode and (ii) and engine braking mode.

23. The method of claim 21, further comprising:
- providing only a single exhaust rocker arm on each cylinder of the plurality of cylinders.

* * * * *